United States Patent

Stolzer et al.

[11] 3,758,644
[45] Sept. 11, 1973

[54] O,N-DI-ALIPHATIC HYDROCARBONS-S-(N-MONOALKYLICARBANYL-METHYL)-THIONOTHIOLPHOSPHORIC ACID ESTER AMIDES

[75] Inventors: Claus Stolzer, Wuppertal-Vohwinkel; Ingeborg Hammann, Cologne; Gunter Unterstenhoffer; Bernhard Homeyer, both of Opladen, all of Germany

[73] Assignee: Bayer Aktiengescellschaft, Leverkusen, Germany

[22] Filed: July 8, 1971

[21] Appl. No.: 160,892

[30] Foreign Application Priority Data
July 15, 1970 Germany.................. P 20 35 074.7

[52] U.S. Cl.............. 260/940, 260/465.4, 260/943, 260/959, 260/979, 424/210, 424/211
[51] Int. Cl........................... A01n 9/36, C07f 9/16
[58] Field of Search............................. 260/940, 943

[56] References Cited
UNITED STATES PATENTS
3,013,940  12/1961  Fusco et al. .................... 260/943 X
3,106,510  10/1963  Szabo et al. .................... 260/943 X
3,265,773  8/1966  Losco et al. ........................ 260/943

*Primary Examiner*—Lewis Gotts
*Assistant Examiner*—Richard L. Raymond
*Attorney*—Ralph D. Dinklage et al.

[57]  ABSTRACT

O,N-di-aliphatic hydrocarbon-S-[N'-monoalkylcarbamylmethyl]-thionothiolphosphoric acid ester amides of general formula

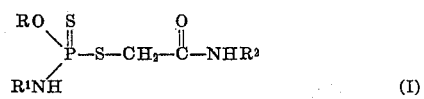

in which
R and $R^1$ are each an alkyl, cycloalkyl or alkenyl radical with up to six carbon atoms, and
$R^2$ is an alkyl radical with up to six carbon atoms carrying at least one halogen, cyano, lower alkoxy or alkylmercapto radical, which possess insecticidal, acaricidal, and nematocidal properties.

8 Claims, No Drawings

O,N-DI-ALIPHATIC HYDROCARBONS-S-(N-MONOALKYLICARBANYL-METHYL)-THIONOTHIOLPHOSPHORIC ACID ESTER AMIDES

The present invention relates to and has for its objects the provision of particular new O,N-di-aliphatic hydrocarbon-S-[N'-monoalkylcarbamylmethyl]-thionothiolphas-phoric acid ester amides, i.e. O-alkyl- or alkenyl-N-monalkyl- or alkenyl-S-[N'-(substituted-monoalkyl)-carbamylmethyl]-thiomothiolphosphoric acid ester amides, which possess insecticidal, acaricidal and nematocidal properties, ctive active in the form of mixtures of such compounds with solid and liquid dispersible carrier vehicles, and methods for producing such compounds and for using such compounds in a new way especially for combating pests, e.g. insects, acarids and nematodes, with other and further objects becoming apparent from a study of the within specification and accompanying examples.

It is known from German Published Specification No. 1,138,977, Belgian Patent Specification No. 597,523, published Dutch Patent Application No. 6,902,315, and published Japanese Patent Applications 647/64 and 72352/66, that O,O-dialkyl-S-[N-monoalkylcarbamylmethyl]-thionothiol-phosphoric acid esters, for example O,O-diethyl-S-[N-mono-1-methyl-1-cyano-ethyl-carbamylmethyl]- or O,O-dimethyl-S-[N-mono-2-methoxyethyl-carbamylmethyl]-thionothiolphosphoric acid ester (Compounds A and B, respectively), possess insecticidal and acaricidal activity.

The present invention provides, as new compounds, the O-alkyl-N-monoalkyl-S-[N'-monoalkyl-carbamylmethyl]-thiono-thiolphosphoric acid ester amides of the general formula:

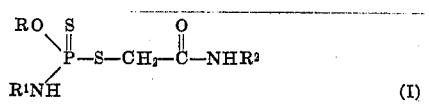

in which
R and R$^1$ are each an alkyl, cycloalkyl or alkenyl radical with up to six carbon atoms, and
R$^2$ is an alkyl radical with up to six carbon atoms carrying at least one halogen, cyano, lower alkoxy or alkyl-mercapto radical.

These new compounds have been found to possess strong nematocidal, insecticidal and acaricidal properties.

The present invention also provides a process for the preparation of a compound of the aforesaid formula (I), in which an O-alkyl-N-monoalkyl-thionothiolphosphoric acid ester amide salt of the general formula:

in which
R and R$^1$ have the meanings stated above, and
M denotes an alkali metal equivalent, an alkaline earth metal equivalent or an optionally alkyl-substituted ammonium equivalent, is reacted with a haloacetic acid amide of the general formula:

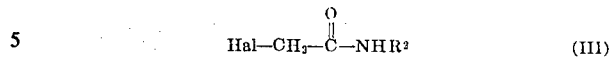

in which
R$^2$ has the meaning stated above, and
Hal denotes a halogen atom, preferably a chlorine or bromine atom.

Surprisingly, the new O-alkyl-N-monoalkyl-S-[N'-mono-alkylcarbomylmethyl]-thionothiolphosporic acid ester amides of the formula (I) show a noteworthy nematocidal activity and, in some cases, also a better insecticidal and acaricidal activity than the known O,-O-dialkyl-S-[N-monoalkylcarbamyl-methyl]-thionothiolphosphoric acid esters which are the chemically most closely comparable active compounds of the same type of activity. The compounds according to the invention therefore represent a genuine enrichment of the art.

If, for example, the sodium salt of O-ethyl-N-mono-isopropyl-thionothiolphosphoric acid ester amide and bromo-acetic acid mono-1-methyl-1-cyano-ethyl amide are used as starting materials, the reaction course can be represented by the following equation:

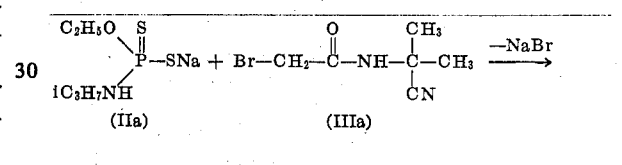

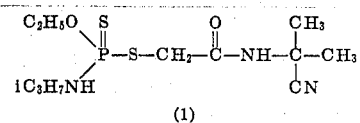

Preferably, R and R$^1$ each is a straight-chain or branched alkyl radical with up to four carbon atoms, namely methyl, ethyl, n- or isopropyl or n-, iso-, sec.- or tert.- butyl or a cycloalkyl radical with five to six carbon atoms; R$^2$ preferably denotes a straight-chain or branched alkyl radical with up to four carbon atoms substituted by chlorine, cyano, methoxy or methylmercapto. As example of the starting materials of the formula (II) which can be used, there are mentioned the potassium, sodium or ammonium salts of O-methyl-N-methyl-, O-methyl-N-ethyl-, O-methyl-N-n-propyl, O-methyl-N-isopropyl-, O-methyl-N-(n-, iso-, sec.-, tert.-)-butyl-, O-ethyl-N-methyl-, O-ethyl- N-ethyl-, O-ethyl-N-N-propyl-, O-ethyl-N-iso-propyl-, O-ethyl-N-(n-, iso-, sec.-, tert.-)-butyl-, O-n-propyl-N-methyl-, O-n-propyl-N-ethyl-, O-n-propyl-N-n-propyl-, O-n-propyl-N- iso-propyl-, O-n-propyl-N-(n-, iso-, sec.-, tert.-)-butyl-, O-iso-propyl-N-methyl-, O-osp-propyl-N-ethyl-, O-iso-propyl-N-n-propyl, O-iso-propyl-N-iso-propyl-, O-iso-propyl-N-(n-, iso-,sec.-, tert.-)-butyl-, O-(n-, iso-, sec.-, tert.-)-butyl-N-ethyl- and O-(n-, iso-, sec.-, tert.-)-butyl-N-iso-propyl-thiono-thiolphosphoric acid ester amides.

The preparative process is expediently carried out using a solvent or diluent, for which purposes all inert organic solvents and diluents are suitable, especially aliphatic and aromatic optionally chlorinated hydrocarbons, such as benzene, toluene, xylenes, benzine, methylene chloride, chloroform, carbon tetrachloride and chlorobenzene; ethers, such as diethyl and dibutyl ethers and dioxane; ketones, such as acetone and methylethyl, methylisopropyl and methylisobutyl ketones; nitriles, such as acetonitrile; and alcohols such as methanol, ethanol and isopropanol. In some cases also water is a suitable solvent or diluent. The reaction temperatures can be varied within a fairly wide range. In general, the reaction is at about 0° to 100°C, preferably about 0° to 40°C. The effected reaction is, in general, carried out at normal pressure.

When carrying out the preparative process, the compounds of the formula (II) and the haloacetic acid amides of formula (III) are, in most cases, used in substantially equimolar amounts. An excess of one or the other of the reactants brings no substantial advantages. The reaction is preferably effected in one of the abovementioned solvents at about 0° to 40°C. The reaction solution is expediently stirred afterwards for several hours and thereafter worked-up by any customary method.

The compounds according to the invention are obtained in most cases in the form of colorless to slightly brown-colored, viscous, water-insoluble oils which cannot be distilled without decomposition but which can, by so-called "slight distillation," that is longer heating to moderately elevated temperatures under reduced pressure, be freed from the last volatile components and in this way be purified. For their characterization, the refractive index is especially suitable. The compounds obtainable in crystalline form are characterized by their melting points.

As already mentioned, the new compounds according to the invention are distinguished by outstanding nematocidal, insecticidal and acaricidal properties. They possess a good effectiveness against both sucking and biting insects, Diptera, mites, as well as a systemic activity. The products may therefore be used with success in crop protection against the most diverse animal pests.

To the sucking insects contemplated herein there belong, in the main aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudo-coccus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*); and the like.

Also to be classed with the biting insects contemplated herein are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aenus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (Blaberus scus) as well as Henschou enia flexivitta; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acarina) contemplated herein there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* = *Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health and pests of stored products, particularly flies and mosquitoes, the compounds are also distinguished by an outstanding residual activity on wood and clay, as well as a good stability to alkali on limed substrates The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chloro-benzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl fomamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaoline, clays, alumina, silica, chalk, i.e. calcium carbonate, talc, attapulgite, montmorillonite, kieselguhr etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides and nematocides, fungicides, bactericides, or rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. and surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. insects, acarids and nematodes, which comprises applying to at least one of correspondingly (a) such insects, (b) such acarids, (c) such nematodes, and (d) the corresponding habitat thereof, i.e. the locus to be protected, a correspondingly combative or toxic amount, i.e. an insecticidally, acaricidally or nematocidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

IT will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

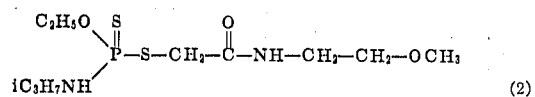

(2)

To 48.6 g (0.22 mole) of the sodium salt of O-ethyl-N-monoisopropyl-thionothiolphosphoric acid ester amide in 200 cc of acetonitrile there are added slowly at room temperature, 30.4 g (0.20 mole) of chloroacetic acid 2-methoxy-ethyl amide in 100 cc of acetonitrile. The reaction mixture is afterwards stirred overnight at room temperature; it is poured into water; the mixture is taken up in benzene; the organic phase is washed neutral with water; it is dried over sodium sulfate; filtration is effected and the filtrate is concentrated. 50.0 g (79.6 percent of theory) of O-ethyl-N-monoiso-propyl-S-[N'-2-methoxyethylcarbamyl-methyl]-thionothiolphosphoric acid ester amide are obtained as a brown oil of refractive index $n_D^{16.5}$ of 1.5320. At 40°C the reaction proceeds in shorter time.

Analogously, the following compounds of Table 1 are prepared:

TABLE 1

| | Constitution | Physical properties |
|---|---|---|
| (3) | $C_2H_5O\underset{CH_3NH}{\overset{}{\diagdown}}\overset{S}{\underset{}{\overset{\|}{P}}}-S-CH_2-\overset{O}{\underset{}{\overset{\|}{C}}}-NH-CH_2-CH_2-OCH_3$ | M.P. 93° C. |
| (4) | $C_2H_5O\underset{CH_3NH}{\overset{}{\diagdown}}\overset{S}{\underset{}{\overset{\|}{P}}}-S-CH_2-\overset{O}{\underset{}{\overset{\|}{C}}}-NH-CH_2-OCH_3$ | $n_D^{23}=1.5503$. |
| (5) | $C_2H_5O\underset{iC_3H_7NH}{\overset{}{\diagdown}}\overset{S}{\underset{}{\overset{\|}{P}}}-S-CH_2-\overset{O}{\underset{}{\overset{\|}{C}}}-NH-CH_2-OCH_3$ | $n_D^{19}=1.5374$. |
| (6) | $C_2H_5O\underset{CH_3NH}{\overset{}{\diagdown}}\overset{S}{\underset{}{\overset{\|}{P}}}-S-CH_2-\overset{O}{\underset{}{\overset{\|}{C}}}-NH-\underset{CN}{\overset{CH_3}{\overset{\|}{C}}}-CH_3$ | $n_D^{21}=1.5458$. |
| (1) | $C_2H_5O\underset{iC_3H_7NH}{\overset{}{\diagdown}}\overset{S}{\underset{}{\overset{\|}{P}}}-S-CH_2-\overset{O}{\underset{}{\overset{\|}{C}}}-NH-\underset{CN}{\overset{CH_3}{\overset{\|}{C}}}-CH_3$ | $n_D^{28}=1.5274$. |
| (7) | $C_2H_5O\underset{CH_3NH}{\overset{}{\diagdown}}\overset{S}{\underset{}{\overset{\|}{P}}}-S-CH_2-\overset{O}{\underset{}{\overset{\|}{C}}}-NH-CH_2CH_2SCH_3$ | $n_D^{23}=1.5733$. |
| (8) | $C_2H_5O\underset{iC_3H_7NH}{\overset{}{\diagdown}}\overset{S}{\underset{}{\overset{\|}{P}}}-S-CH_2-\overset{O}{\underset{}{\overset{\|}{C}}}-NH-CH_2CH_2SCH_3$ | $n_D^{21.5}=1.5579$ |
| (9) | $C_2H_5O\underset{CH_3NH}{\overset{}{\diagdown}}\overset{S}{\underset{}{\overset{\|}{P}}}-S-CH_2-\overset{O}{\underset{}{\overset{\|}{C}}}-NH-CH_2-CH_2-Cl$ | $n_D^{24}=1.5720$. |
| (10) | $C_2H_5O\underset{iC_3H_7NH}{\overset{}{\diagdown}}\overset{S}{\underset{}{\overset{\|}{P}}}-S-CH_2-\overset{O}{\underset{}{\overset{\|}{C}}}-NH-CH_2-CH_2-Cl$ | $n_D^{22.5}=1.5471$. |
| (11) | $C_2H_5O\underset{sec.-C_4H_9-NH}{\overset{}{\diagdown}}\overset{S}{\underset{}{\overset{\|}{P}}}-S-CH_2-\overset{}{\underset{O}{\overset{\|}{C}}}-NH-CH_2-CH_2-O-CH_3$ | $n_D^{24}=1.5264$. |
| (12) | $n\text{-}C_3H_7O\underset{i\text{-}C_3H_7-NH}{\overset{}{\diagdown}}\overset{S}{\underset{}{\overset{\|}{P}}}-S-CH_2-\overset{}{\underset{O}{\overset{\|}{C}}}-NH-CH_2-CH_2-O-CH_3$ | $n_D^{23.5}=1.5241$. |
| (13) | $C_2H_5O\underset{i\text{-}C_4H_9-NH}{\overset{}{\diagdown}}\overset{S}{\underset{}{\overset{\|}{P}}}-S-CH_2-\overset{}{\underset{O}{\overset{\|}{C}}}-NH-CH_2-CH_2-O-CH_3$ | $n_D^{25}=1.5255$. |
| (14) | $C_2H_5O\underset{sec.-C_4H_9-NH}{\overset{}{\diagdown}}\overset{S}{\underset{}{\overset{\|}{P}}}-S-CH_2-\underset{O}{\overset{\|}{C}}-NH-\underset{CN}{\overset{CH_3}{\overset{\|}{C}}}-CH_3$ | $n_D^{20}=1.5278$. |
| (15) | $C_2H_5O\underset{i\text{-}C_4H_9-NH}{\overset{}{\diagdown}}\overset{S}{\underset{}{\overset{\|}{P}}}-S-CH_2-\underset{O}{\overset{\|}{C}}-NH-\underset{CN}{\overset{CH_3}{\overset{\|}{C}}}-CH_3$ | $n_D^{24}=1.5245$. |
| (16) | $n\text{-}C_3H_7O\underset{i\text{-}C_3H_7-NH}{\overset{}{\diagdown}}\overset{S}{\underset{}{\overset{\|}{P}}}-S-CH_2-\underset{O}{\overset{\|}{C}}-NH-\underset{CN}{\overset{CH_3}{\overset{\|}{C}}}-CH_3$ | $n_D^{21}=1.5241$. |

TABLE 1 Continued

| Constitution | Physical properties |
|---|---|
| (17) ![structure] C₂H₅O, CH₂=CH—CH₂—NH \P(=S)—S—CH₂—C(=O)—NH—C(CH₃)(CN)—CH₃ | $n_D^{22} = 1.5412$ |
| (18) C₂H₅O, CH₂=CH—CH₂—NH \P(=S)—S—CH₂—C(=O)—NH—CH₂—CH₂—OCH₃ | $n_D^{24} = 1.5415$ |
| (19) C₂H₅O, i-C₃H₇—NH \P(=S)—S—CH₂—C(=O)—NH—CH₂—CH₂—CN | $n_D^{24} = 1.5396$ |
| (20) C₂H₅O, C₆H₁₁—NH \P(=S)—S—CH₂—C(=O)—NH—CH₂—CH₂—O—CH₃ | $n_D^{23} = 1.5419$ |
| (21) C₂H₅O, C₆H₁₁—NH \P(=S)—S—CH₂—C(=O)—NH—C(CH₃)(CN)—CH₃ | $n_D^{23.5} = 1.5363$ |
| (22) C₂H₅O, C₆H₁₁—NH \P(=S)—S—CH₂—C(=O)—NH—CH₂—O—CH₃ | $n_D^{28.5} = 1.5412$ |

EXAMPLE 2

Phaedon larvae test

Solvent: 3 parts by weight acetone
Emulsifier: 1 part by weight alkylarylpolyglycol ether To produce a suitable preparation of active compound, one part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100 percent means that all the beetle larvae are killed. 0 percent means that none of the beetle larvae are killed.

The active compounds, the concentration of the active compound, the times of evaluation and the results can be seen from the following Table 2:

EXAMPLE 3

Myzus test (contact action)

Solvent: 3 parts by weight acetone
Emulsifier: 1 part by weight alkylarylpolyglycol ether To produce a suitable preparation of active compound, one part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 3:

TABLE 2.—PHAEDON LARVAE TEST

| Active compounds | Concentration of active compound in percent | Degree of destruction in percent after 3 days |
|---|---|---|
| (A) (C₂H₅O)₂P(=S)—S—CH₂—C(=O)—NH—C(CH₃)(CN)—CH₃ (known) | 0.1<br>0.01 | 100<br>20 |
| (6) C₂H₅O, CH₃—NH \P(=S)—S—CH₂—C(=O)—NH—C(CH₃)(CN)—CH₃ | 0.1<br>0.01 | 100<br>90 |
| (5) C₂H₅O, i-C₃H₇—NH \P(=S)—S—CH₂—C(=O)—NH—CH₂—COH₃ | 0.1<br>0.01 | 100<br>80 |
| (2) C₂H₅O, i-C₃H₇—NH \P(=S)—S—CH₂—C(=O)—NH—CH₂—CH₂—O—CH₃ | 0.1<br>0.01 | 100<br>100 |

TABLE 3.—MYZUS TEST

| Active compounds | Concentration of active compound in percent | Degree of destruction in percent after 1 day |
|---|---|---|
| (B) $(CH_3O)_2\overset{S}{\overset{\|}{P}}-S-CH_2-\overset{O}{\overset{\|}{C}}-NH-CH_2-CH_2-O-CH_3$ (known) | 0.1<br>0.01 | 95<br>70 |
| (A) $(C_2H_5O)_2\overset{S}{\overset{\|}{P}}-S-CH_2-\overset{O}{\overset{\|}{C}}-NH-\underset{\underset{CN}{\|}}{\overset{CH_3}{\overset{\|}{C}}}-CH_3$ (known) | 0.1<br>0.01 | 100<br>45 |
| (4) $\underset{CH_3-NH}{\overset{C_2H_5O}{>}}\overset{S}{\overset{\|}{P}}-S-CH_2-\overset{O}{\overset{\|}{C}}-NH-CH_2-OCH_3$ | 0.1<br>0.01 | 100<br>100 |
| (3) $\underset{CH_3-NH}{\overset{C_2H_5O}{>}}\overset{S}{\overset{\|}{P}}-S-CH_2-\overset{O}{\overset{\|}{C}}-NH-CH_2-CH_2-O-CH_3$ | 0.1<br>0.01 | 100<br>100 |
| (5) $\underset{i-C_3H_7-NH}{\overset{C_2H_5O}{>}}\overset{S}{\overset{\|}{P}}-S-CH_2-\overset{O}{\overset{\|}{C}}-NH-CH_2-OCH_3$ | 0.1<br>0.01 | 100<br>100 |
| (1) $\underset{i-C_3H_7-NH}{\overset{C_2H_5O}{>}}\overset{S}{\overset{\|}{P}}-S-CH_2-\overset{O}{\overset{\|}{C}}-NH-\underset{\underset{CN}{\|}}{\overset{CH_3}{\overset{\|}{C}}}-CH_3$ | 0.1<br>0.01 | 100<br>75 |

EXAMPLE 4

Tetranychus test

Solvent: 3 parts by weight acetone
Emulsifier: 1 part by weight alkylarylpolyglycol ether To produce a suitable preparation of active compound, one part by weight of the active compound is mixed with the stated amount of solvent containing the stated amount of emulsifier and the concentrate so obtained is diluted with water to the desired concentration.

Been plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from Table 4:

TABLE 4.—TETRANYCHUS TEST

| Active compounds | Concentration of active compound in percent | Degree of destruction in percent after 2 days |
|---|---|---|
| (C) $(C_2H_5O)_2\overset{S}{\overset{\|}{P}}-S-CH_2-\overset{O}{\overset{\|}{C}}-NH-CH_2-OCH_3$ (known) | 0.1<br>0.01 | 65<br>0 |
| (A) $(C_2H_5O)_2\overset{S}{\overset{\|}{P}}-S-CH_2-\overset{O}{\overset{\|}{C}}-NH-\underset{\underset{CN}{\|}}{\overset{CH_3}{\overset{\|}{C}}}-CH_3$ (known) | 0.1<br>0.01 | 60<br>0 |
| (4) $\underset{CH_3-NH}{\overset{C_2H_5O}{>}}\overset{S}{\overset{\|}{P}}-S-CH_2-\overset{O}{\overset{\|}{C}}-NH-CH_2-OCH_3$ | 0.1<br>0.01 | 95<br>45 |
| (3) $\underset{CH_3-NH}{\overset{C_2H_5O}{>}}\overset{S}{\overset{\|}{P}}-S-CH_2-\overset{O}{\overset{\|}{C}}-NH-CH_2-CH_2-O-CH_3$ | 0.1<br>0.01 | 90<br>0 |
| (6) $\underset{CH_3-NH}{\overset{C_2H_5O}{>}}\overset{S}{\overset{\|}{P}}-S-CH_2-\overset{O}{\overset{\|}{C}}-NH-\underset{\underset{CN}{\|}}{\overset{CH_3}{\overset{\|}{C}}}-CH_3$ | 0.1<br>0.01 | 100<br>10 |
| (2) $\underset{i-C_3H_7-NH}{\overset{C_2H_5O}{>}}\overset{S}{\overset{\|}{P}}-S-CH_2-\overset{O}{\overset{\|}{C}}-NH-CH_2-CH_2-O-CH_3$ | 0.1<br>0.01 | 98<br>20 |

TABLE 4.—TETRANYCHUS TEST—Continued

| Active compounds | Concentration of active compound in percent | Degree of destruction in percent after 2 days |
|---|---|---|
| (1) $C_2H_5O$—P(=S)(—S—$CH_2$—C(=O)—NH—C(CH_3)(CN)—$CH_3$)—NH—i-$C_3H_7$ | 0.1<br>0.01 | 90<br>20 |

EXAMPLE 5

Myzus test (lasting systemic effect)
  Solvent   3 parts by weight acetone
  Emulsifier:   1 parts by weight alkylarylpolyglycol ether To produce a suitable preparation of active compound, 1 part by weight of active compound is mixed with the stated amount of solvent which contains the stated amount of emulsifier, and the concentrate is diluted with water to the desired concentration of 0.025 percent of active compound.

Cabbage plants (*Brassica oleracea*) are watered with, in each case, 50 ml of the preparation of active compound so that the preparation of active compound penetrates into the soil without wetting the leaves of the cabbage plants. The active compound is taken up by the cabbage plants from the soil and so reaches the leaves. There are applied 12.5 mg of active compound to 100 g of soil (weighed air-dry).

After the times stated, the plants are infested with peach aphids (*Myzus persicae*) and their mortality is, in each case, determined after three days. 100 percent means that all the aphids were killed; 0 percent means that none of the aphids were killed.

The active compounds, concentrations of active compound, evaluation times and results can be seen from the following Table 5:

EXAMPLE 6

Critical concentration test
  Test nematode:   Meloidogyne sp.
  Solvent:   3 parts by weight acetone
  Emulsifier:   1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27°C. After four weeks, the lettuce roots are examined for infestation with nematodes, and the degree of destruction of the active compound is determined as a percentage. The degree of effectiveness is 100 percent when infestation is completely avoided; it is 0 percent when the infestation is exactly the same as in the case of the control plants in untreated soil which has been infested in the same manner.

TABLE 5

[Lasting effect after watering: Myzus persicae/Brassica oleracea]

| Active compounds | Mg. active compound on 100 g. soil (weighed air-dry) | Degree of destruction in percent after (days) | | | | | |
|---|---|---|---|---|---|---|---|
| | | 13 | 17 | 20 | 24 | 27 | 31 |
| (B) $CH_3O$—P(=S)(—S—$CH_2$—C(=O)—NH—$CH_2$—$CH_2$—O—$CH_3$)—$OCH_3$ (known) | 12.5 | 100 | 90 | 95 | 100 | 50 | 30 |
| (3) $C_2H_5O$—P(=S)(—S—$CH_2$—C(=O)—NH—$CH_2$—$CH_2$—O—$CH_3$)—NH—$CH_3$ | 12.5 | 100 | 100 | 100 | 100 | 100 | 100 |
| (6) $C_2H_5O$—P(=S)(—S—$CH_2$—C(=O)—NH—C(CH_3)(CN)—$CH_3$)—NH—$CH_3$ | 12.5 | 100 | 100 | 100 | 100 | 100 | 100 |

The active compounds, the amounts applied and the results can be seen from the following Table 6:

TABLE 6.—NEMATOCIDES/MELOIDOGYNE INCOGNITA

| Active compound (constitution) | Degree of destruction in percent with a concentration of active compound in p.p.m. of— | | | | | | |
|---|---|---|---|---|---|---|---|
| | 50 | 40 | 20 | 10 | 5 | 2.5 | 1.2 |
| (5) C₂H₅O\P(S)(i-C₃H₇—NH)/—S—CH₂—C(O)—NH—CH₂—CH₂—O—CH₃ | 100 | 100 | 100 | 98 | 95 | 75 | |
| (10) C₂H₅O\P(S)(i-C₃H₇—NH)/—S—CH₂—C(O)—NH—C(CH₃)(CN)—CH₃ | 100 | 100 | 100 | 100 | 100 | 95 | 95 |
| (9) C₂H₅O\P(S)(CH₃—NH)/—S—CH₂—C(O)—NH—C(CH₃)(CN)—CH₃ | 100 | 100 | 100 | 98 | 75 | | |
| (8) C₂H₅O\P(S)(i-C₃H₇—NH)/—S—CH₂—C(O)—NH—CH₂—OCH₃ | 100 | 100 | 100 | 99 | | | |
| (12) C₂H₅O\P(S)(i-C₃H₇—NH)/—S—CH₂—C(O)—NH—CH₂—CH₂—SCH₃ | 100 | 98 | 96 | 95 | | | |
| (B) CH₃O\P(S)(CH₃O)/—S—CH₂—C(O)—NH—CH₂—CH₂—O—CH₃ (known) | 0 | | | | | | |
| (D) C₂H₅O\P(S)(C₂H₅O)/—S—CH₂—C(O)—NH—CH₂—CH₂—O—CH₃ (known) | 0 | | | | | | |
| (A) C₂H₅O\P(S)(C₂H₅O)/—S—CH₂—C(O)—NH—C(CH₃)(CN)—CH₃ (known) | 75 | 30 | | | | | |
| (E) CH₃O\P(S)(CH₃O)/—S—CH₂—C(O)—NH—CH₂—OCH₃ (known) | 0 | | | | | | |
| (C) C₂H₅O\P(S)(C₂H₅O)/—S—CH₂—C(O)—NH—CH₂—OCH₃ (known) | 0 | | | | | | |

It will be appreciated that the instant specification and examples are set forth by way of illustration and not limitation, and that various modifications and changes may be made without departing from the spirit and scope of the present invention.

What is claim is:

1. Thionothiolphosphoric acid ester amides of the general formula

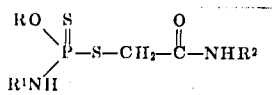

in which

R and R¹ are each an alkyl, cycloalkyl or alkenyl radical with up to six carbon atoms, and R² is an alkyl radical with up to six carbon atoms carrying a halogen, cyano, lower alkoxy or alkylmercapto radical.

2. Compounds according to claim 1 in which R, R¹ and R² each is a straight-chain or branched alkyl radical with up to four carbon atoms, R² carrying a chlorine, cyano, methoxy or methylmercapto.

3. A thionothiolphosphoric acid ester amide according to claim 1 where such ester amide is O-ethyl-N-monomethyl-S-[-N'-1-methyl-1-cyano-ethylcarbomyl-methyl]-thionothiol-phosphoric acid ester amide of the formula

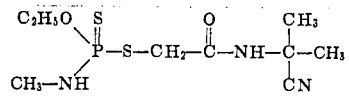

4. A thionothiolphosphoric acid ester amide according to claim 1 where such ester amide is O-ethyl-N-monoisopropyl-S-[N'-methoxymethylcarbamyl-methyl]-thionothiolphosphoric acid ester amide of the formula

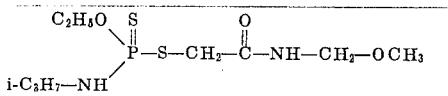

5. A thionothiolphosphoric acid ester amide according to claim 1 where such ester amide is O-ethyl-N-monoisopropyl-S-[N'-methoxymethylcarbamyl-methyl]-thionothiolphosphoric acid ester amide of the formula

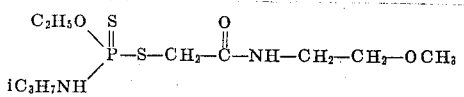

6. A thionothiolphosphoric acid ester amide according to claim 1 where such ester amide is O-ethyl-N-monomethyl-S-[N'-2-methoxyethylcarbamyl-methyl]-thionothiolphosphoric acid ester amide of the formula

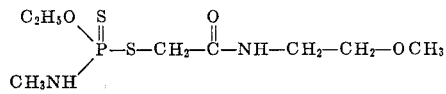

7. A thionothiolphosphoric acid ester amide according to claim 1 where such ester amide is O-ethyl-N-monomethyl-S-[N'-methoxymethylcarbamyl-methyl]-thionothiolphosphoric acid ester amide of the formula

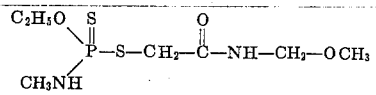

8. A thionothiolphosphoric acid ester amide according to claim 1 where such ester amide is O-ethyl-N-monoisopropyl-S-[N'-1-methyl-1-cyano-ethylcarbamyl-methyl]-thionothiol-phosphoric acid ester amide of the formula

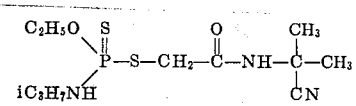

* * * * *

PO-1050
(5/69)

UNITED STATES PATENT OFFICE    Farben 1988

CERTIFICATE OF CORRECTION

Patent No. 3,758,644      Dated September 11, 1973

Inventor(s) Claus Stolzer et al

It is certified that error appears in the above-identified patent and that said Letters Patent are hereby corrected as shown below:

Page 1, item [54] and Col. 1 - correct title to read
--O,N-DI-ALIPHATIC HYDROCARBON-S-[N'-MONOALKLYCARBAMYLETHYL]-THIONOTHIOLPHOSPHORIC ACID ESTER AMIDES--.

Col. 1, line 9, correct spelling of "thionothiolphosphoric";
      line 13, cancel "ctive"; same line, after "active" insert --compositions--;
      line 60, in the formula, change "SN" to --SM--.

Col. 2, line 12, correct spelling of "alkylcarbamylmethyl";
      line 54, cancel "N" (second occurrence) and substitute -- n --;
      line 59, change "osp" to -- iso --.

Col. 4, line 34, change "scus" to -- fuscus --; same line cancel "Henschou enia" and substitute --Henschoutedenia--.

Col. 5, line 32, correct spelling of "formamide";
      line 36, correct spelling of "kaoline".

Col. 9, Table 2, Compound (5), at end of formula, change "$COH_3$" to --$OCH_3$--.

Col. 11, line 42, change "Been" to --Bean--.

Col. 15, line 57, change "claim" to --claimed--.

Col. 16, line 59, Claim 3, correct spelling of "ethylcarbamyl".

Signed and sealed this 17th day of September 1974.

(SEAL)
Attest:

McCOY M. GIBSON JR.      C. MARSHALL DANN
Attesting Officer      Commissioner of Patents